(12) United States Patent
Eguchi

(10) Patent No.: US 9,383,602 B2
(45) Date of Patent: Jul. 5, 2016

(54) LIQUID CRYSTAL DEVICE WITH ANTIREFLECTIVE STRUCTURE AND ELECTRONIC APPARATUS

(71) Applicant: Seiko Epson Corporation, Tokyo (JP)

(72) Inventor: Yoshikazu Eguchi, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 267 days.

(21) Appl. No.: 13/665,211

(22) Filed: Oct. 31, 2012

(65) Prior Publication Data

US 2013/0107181 A1 May 2, 2013

(30) Foreign Application Priority Data

Nov. 2, 2011 (JP) ................................ 2011-240912

(51) Int. Cl.
  *G02F 1/1335* (2006.01)
  *H04N 9/31* (2006.01)

(52) U.S. Cl.
  CPC ........ *G02F 1/133555* (2013.01); *H04N 9/3105* (2013.01)

(58) Field of Classification Search
  USPC ......................................................... 349/110
  See application file for complete search history.

(56) References Cited

U.S. PATENT DOCUMENTS

| | | | |
|---|---|---|---|
| 6,414,734 B1 | 7/2002 | Shigeta et al. | |
| 7,968,185 B1 | 6/2011 | Noguchi et al. | |
| 8,253,873 B2 * | 8/2012 | Sasaki et al. | 349/38 |
| 2005/0264728 A1 * | 12/2005 | Funahata et al. | 349/114 |
| 2006/0139517 A1 * | 6/2006 | Ahn | G02F 1/133512 349/110 |
| 2011/0134350 A1 * | 6/2011 | Yamazaki et al. | 349/43 |

FOREIGN PATENT DOCUMENTS

| | | | |
|---|---|---|---|
| EP | 0569922 A | | 11/1903 |
| EP | 0 569 922 | * | 11/1993 |
| EP | 0816874 A | | 1/1998 |
| JP | 6-102499 A | | 4/1994 |
| JP | 08-062592 A | | 3/1996 |
| JP | 9-197102 A | | 7/1997 |
| JP | 2000-56297 A | | 2/2000 |
| JP | 2001-209034 A | | 8/2001 |
| JP | 2005-140836 A | | 6/2005 |
| JP | 2005-258004 A | | 9/2005 |
| JP | 2006-346878 A | | 12/2006 |
| JP | 2007-178774 A | | 7/2007 |
| JP | 2009-58913 A | | 3/2009 |

* cited by examiner

*Primary Examiner* — Lauren Nguyen
(74) *Attorney, Agent, or Firm* — ALG Intellectual Property, LLC

(57) ABSTRACT

A liquid crystal layer is disposed between an element substrate and an opposite substrate and a pixel electrode being light-reflective is disposed between an element substrate and a liquid crystal layer, and a planarization layer that is light-transmissive, a first light-transmissive film that has a high refractive index than a refractive index of the planarization layer, a second light-transmissive film that has a lower refractive index than the refractive index of the first light-transmissive film, and a third light-transmissive film that is electrically conductive and has a higher refractive index than the refractive index of the second light-transmissive film are disposed between the opposite substrate and the liquid crystal layer from the opposite substrate side in this order.

5 Claims, 5 Drawing Sheets

LIQUID CRYSTAL DEVICE WITH ANTIREFLECTIVE STRUCTURE AND ELECTRONIC APPARATUS

BACKGROUND

1. Technical Field

The present invention relates to a liquid crystal device and an electronic apparatus including the same.

2. Related Art

As the liquid crystal device, a reflection type liquid crystal display apparatus used in a projector, a projection television and the like and a method for manufacturing the same have been known (JP-A-2007-178774).

This reflection type liquid crystal display apparatus has a liquid crystal layer disposed between a semiconductor substrate on which pixel electrodes having light reflectivity are formed and transparent substrate on which an antireflection film is formed. The antireflection film is formed by laminating a first, second, and third transparent films in this order. The first, second, and third transparent films have a first, second, and third refractive indices, respectively. The second refractive index is smaller than the first refractive index and the third refractive index is larger than the second refractive index. The antireflection film and the pixel electrode are opposite to each other having the liquid crystal layer therebetween. An example disclosed has a second transparent film formed with a silicon oxide film, which is an insulating film, and a first and third transparent films formed with an ITO film. The third transparent film, which is substantially opposite to the pixel electrode with the liquid crystal layer therebetween, works as a transparent electrode. Therefore, intensity of reflective light coming from an interface between the transparent substrate and the liquid crystal layer is reduced and thus it is possible to reduce an interference fringe generated due to the interference of the reflective light and light incident to the transparent substrate.

In a reflection type liquid crystal display apparatus of JP-A-2007-178774, the first and third transparent films including the antireflective film are ITO films and a second transparent film is a silicon oxide film. A thickness of the ITO film is approximately 17 nm and a thickness of the silicon oxide film is approximately 48 nm under a condition that the center wavelength of incident light is 500 nm. Both thicknesses of the films are lower than 100 nm, which is a standard thickness of a common electrode film or an insulating film.

Therefore, when these transparent films are formed on a substrate with uneven surface, a laminate structure, or a light antireflection structure of the transparent films, may be damaged and deformed. Thus, there is a concern that an antireflection function is not obtained for light in a desired wavelength range. The examples of irregularities generated on the substrate surface include marks for alignment and light shielding member (black matrix; BM) for dividing pixels, which are formed by depositing and patterning metal, alloy, and the like.

SUMMARY

The invention can be realized in the following forms or application examples.

Application Example 1

According to Application Example 1, there is provided a liquid crystal device including: a first substrate; a second substrate that is light-transmissive; a liquid crystal layer that is disposed between the first substrate and the second substrate; a pixel electrode that is light-reflective and is disposed between the first substrate and the liquid crystal layer; a planarization layer that is transmissive and is disposed between the second substrate and the liquid crystal layer; a first light-transmissive film that is disposed between the planarization layer and the liquid crystal layer and that has a higher refractive index than that of the planarization layer; a second light-transmissive film that is disposed between the first light-transmissive film and the liquid crystal layer and that has a lower refractive index than that of the first light-transmissive film; and a third light-transmissive film that is electrically conductive, that is disposed between the second light-transmissive film and the liquid crystal layer and that has a higher refractive index than that of the second light-transmissive film.

According to the configuration, a light incident from a second substrate is transmitted through a liquid crystal layer and then is reflected by a pixel electrode. Then the light is transmitted through the liquid crystal layer and is then emitted from the second substrate side. Since a light antireflection structure is formed in the second substrate, the intensity thereof is finished without attenuation when an incident light and a reflective light are transmitted through the second substrate. In addition, since a light antireflection structure is formed on a planarization layer of the second substrate, the light antireflection layer is not affected by irregularities in a surface of the liquid crystal layer side of the second substrate. That is, it is possible to provide a reflection type liquid crystal device capable of providing a bright display.

Application Example 2

According to Application Example 2, there is provided a liquid crystal device including: a first substrate that is light-transmissive; a second substrate that is light-transmissive; a liquid crystal layer that is disposed between the first substrate and the second substrate; a pixel electrode that is transmissive and is disposed between the first substrate and the liquid crystal layer; a planarization layer that is light-transmissive and is disposed between the second substrate and the liquid crystal layer; a first light-transmissive film that is disposed between the planarization layer and the liquid crystal layer and has a higher refractive index than that of the planarization layer; a second light-transmissive film that is disposed between the first light-transmissive film and the liquid crystal layer and has a lower refractive index than that of the first light-transmissive film; a third light-transmissive film that is electrically conductive, that is disposed between the second light-transmissive film and the liquid crystal layer, and that has a larger refractive index than that of the second light-transmissive film.

According to the configuration, for example, a light incident from a second substrate is transmitted through a liquid crystal layer and a pixel electrode and then is emitted from a first substrate side. Since a light antireflection structure is formed on a second substrate, intensity thereof is not reduced when the incident light is transmitted through a second substrate. Since a light antireflection structure is formed on a planarization layer of the second substrate, the light antireflection structure is not affected by irregularities in a surface of the liquid crystal layer of the second substrate. That is, it is possible to provide the transmission type liquid crystal device capable of providing bright light.

Application Example 3

In the liquid crystal device according to Application Example 1 or 2, the planarization layer has the refractive index substantially equal to that of the second substrate and is made of silicon oxide including at least one of boron (B) and phosphorus (P).

According to this configuration, it is possible to provide a liquid crystal device having a bright display and a high reliability in a moisture resistance by providing a planarization layer having a hygroscopicity.

Application Example 4

In the liquid crystal device according to any one of Application Examples 1 to 3, the first light-transmissive film is electrically conductive, the second light-transmissive film has an insulation property and the third light-transmissive film acts as a common electrode, and the second light-transmissive film is not formed with a contact portion electrically connecting the first light-transmissive film to the third light-transmissive film.

According to this configuration, since a contact portion is not formed on light antireflection structure, this configuration prevents water or gas, which may degrade image quality of a display, from a contact portion to penetrate and occlude into a planarization layer and can realize higher reliability.

Application Example 5

In the liquid crystal device according to any one of Application Examples 1 to 4, wherein the liquid crystal device further includes: a driving circuit that is disposed between the end of the first substrate and the pixel area on which the pixel electrode is disposed; and a light-shielding member that is disposed between the second substrate and the planarization layer at a position overlapping with the driving circuit in a plan view.

According to this configuration, the liquid crystal device makes a bright display and the light-shielding member can prevent a malfunction operation of a driving circuit by light incident from a second substrate.

Application Example 6

An electronic apparatus includes the liquid crystal device according to any one of Application Examples 1 to 5.

According to this configuration, since a liquid crystal device has a bright display, it is possible to provide electronic apparatus having good appearance.

BRIEF DESCRIPTION OF THE DRAWINGS

The invention will be described with reference to the accompanying drawings, wherein like numbers reference like elements.

DESCRIPTION OF EXEMPLARY EMBODIMENTS

Detailed embodiments according to the invention will be described with reference to the drawings below. In addition, drawings to be used are illustrated as enlarged and reduced in order that parts to be described are in a properly recognizable state.

First Embodiment

In this embodiment, an active matrix type liquid crystal device including a thin film transistor as a switching element of pixels will be described as an example. The liquid crystal device can be preferably used as a light modulation element (a liquid crystal light valve) for a projection type display device (a liquid crystal projector) described as below.

Liquid Crystal Device

Figure 1A:
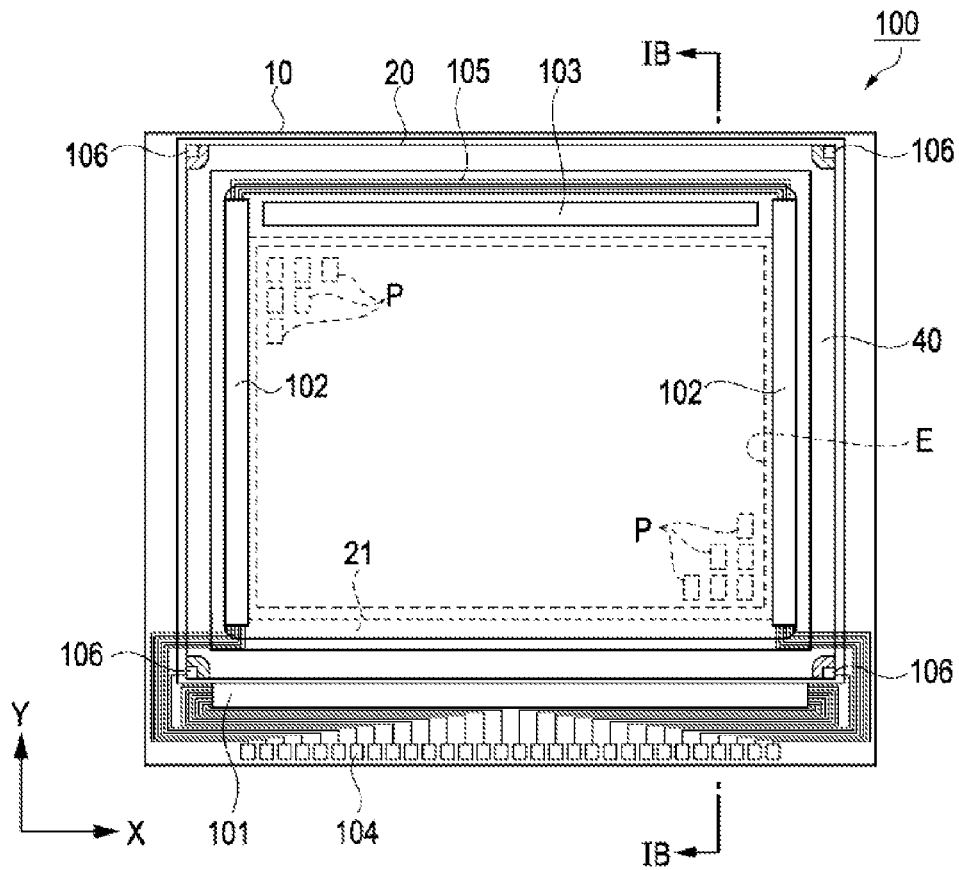
FIG. 1A is a schematic plane view illustrating a configuration of a liquid crystal device.
Figure 2:
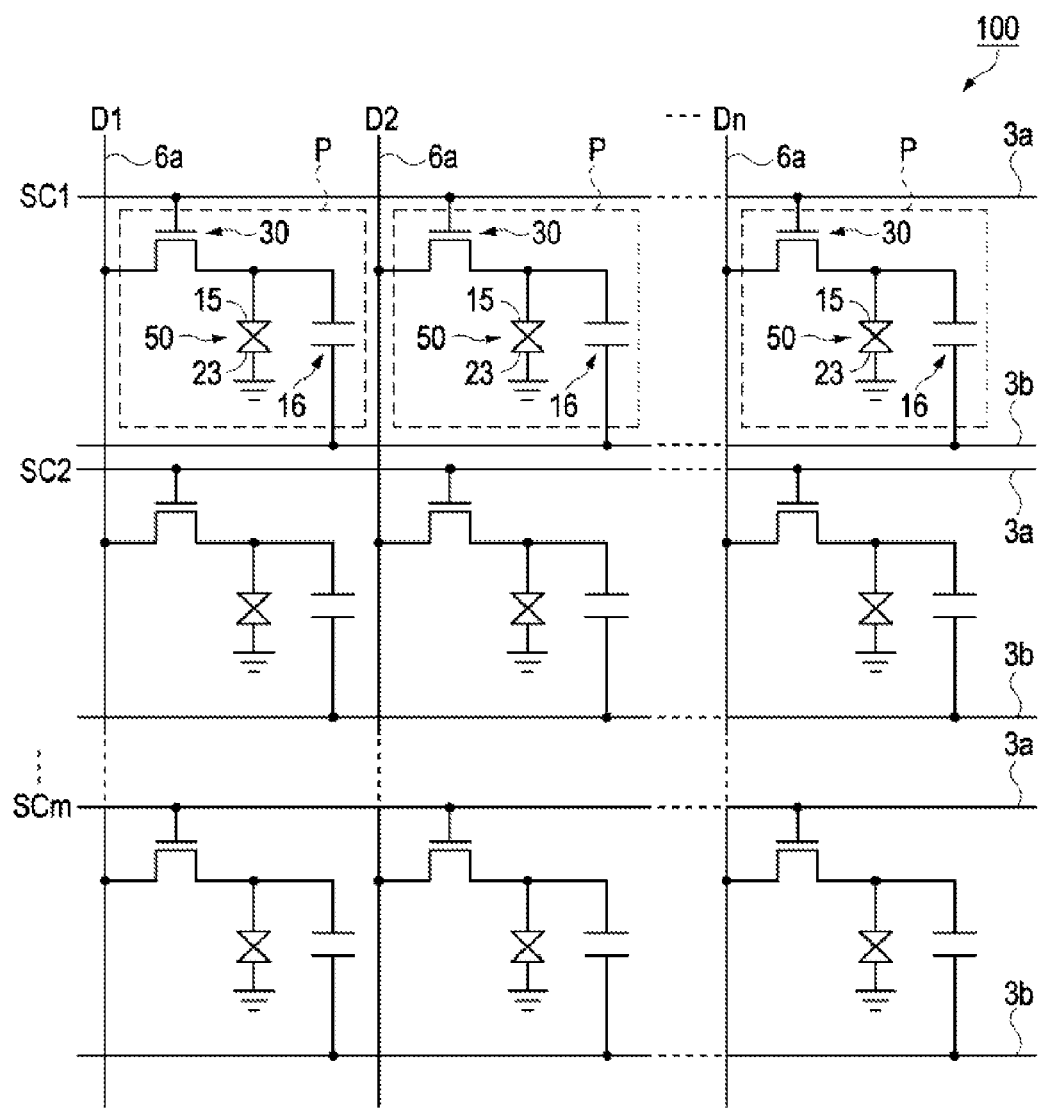
FIG. 2 is an equivalent circuit diagram illustrating an electrical configuration of a liquid crystal device.
Figure 3:
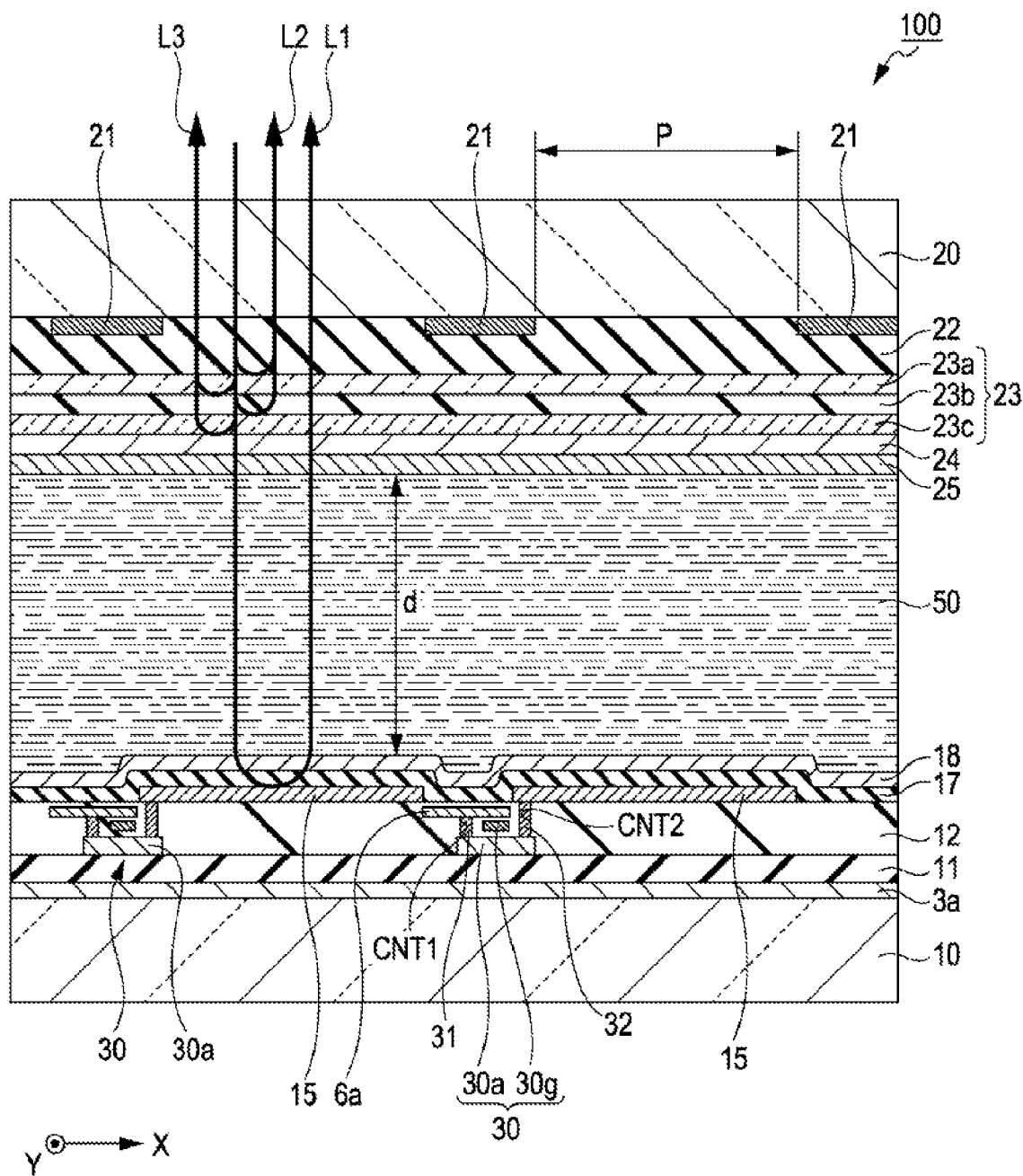
FIG. 3 is a schematic cross-sectional view illustrating a configuration of pixels in a liquid crystal device.

First, a liquid crystal device of the embodiment will be described with reference to FIGS. 1A to 3. FIG. 1A is a schematic plane view illustrating a configuration of a liquid crystal device, FIG. 1B is a schematic cross-sectional view taken from line IB-IB in FIG. 1A, FIG. 2 is an equivalent circuit diagram illustrating an electrical configuration of a liquid crystal device and FIG. 3 is a schematic cross-sectional view illustrating pixels in a liquid crystal device.

Figure 1B:
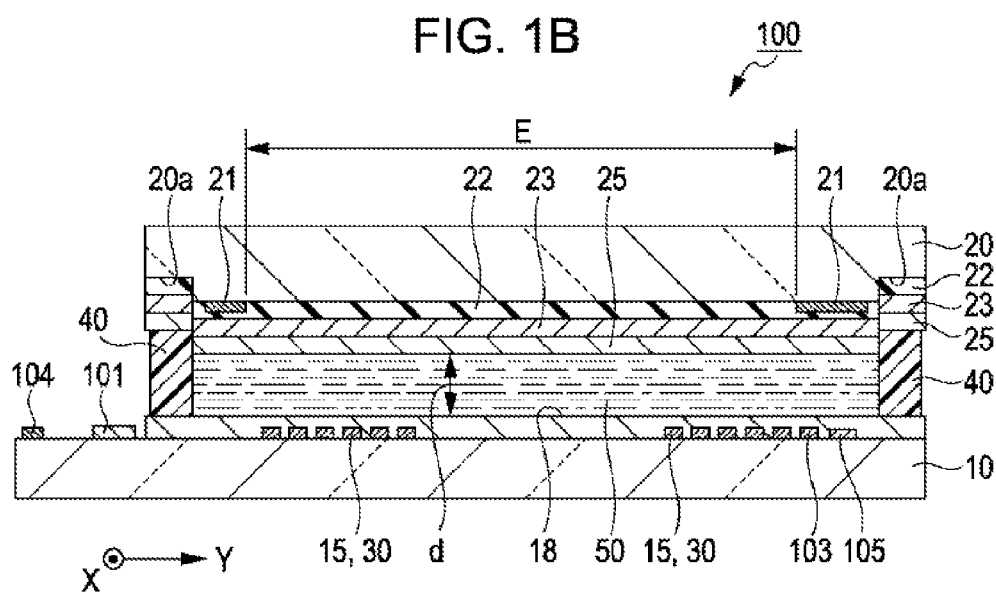
FIG. 1B is a schematic cross-sectional view illustrating a configuration of a liquid crystal device taken from line IB-IB in FIG. 1A.

As illustrated in FIG. 1A and FIG. 1B, a liquid crystal device 100 of the embodiment of the invention includes an element substrates 10 as a first substrate, and an opposite substrate 20 as a second substrate which are disposed to face each other and a liquid crystal layer 50 disposed between the pair of substrates.

As the element substrate 10, a transparent quartz substrate, a glass substrate, an opaque silicon substrate and the like may be used, and the element substrate 10 may be larger than the opposite substrate 20. In addition, the element substrate 10 is bonded to the opposite substrate 20 via a seamless sealing material 40 disposed along an outer periphery of the opposite substrate 20. A liquid crystal with a negative dielectric anisotropy in an area surrounded by the sealing material 40 is sealed to constitute the liquid crystal layer 50.

The sealing (filling) of the liquid crystal between the pair of substrates in the embodiment of the invention is conducted by forming a bank with the sealing material 40 around the outer periphery of one substrate of the pair, and dripping a predetermined amount of the liquid crystal into the area surrounded by the bank. A one drop fill (ODF) method is used to bond the pair of substrates under a reduced pressure.

An adhesive such as epoxy resin having thermosetting or UV-curable thermosetting and the like is used as the sealing material 40. The sealing material 40 is formed with a spacer (not shown) for constantly holding a space between a pair of substrates.

As a light-shielding member, a parting unit 21 disposed to surround a pixel area E is formed within the sealing material 40.

The pixel area E includes a plurality of pixels P in a matrix array. The pixel area E may include a plurality of dummy pixels disposed to surround a plurality of pixels P that contribute effectively to display. In addition, although it is not illustrated in FIGS. 1A and 1B, even in the pixel area E, a light-shielding member (a black matrix; BM) which divides a plurality of pixels P in a plane view is disposed on the same layer as the parting unit 21 in the opposite substrate 20.

Between the sealing material 40 along a lower side of the element substrate 10 and the side portion thereof, a data line driving circuit 101 is disposed. In addition, a detection circuit 103 is disposed within the sealing material 40 along an upper side of the element substrate. In addition, a scanning line driving circuit 102 is disposed within the sealing material 40 along a right and left sides of the element substrate to be perpendicular to each other. A plurality of wires 105 connecting the two scanning line driving circuits 102 are disposed within the sealing material 40 along the upper side. The wires connected to the data line driving circuit 101 and the scanning line driving circuit 102 are connected to a plurality of external connection terminals 104 arranged along the lower side of the element substrate.

As described below, it is assumed that a direction along the upper and lower sides is an X direction and a direction along the right and left sides perpendicular to the upper and lower sides is a Y direction.

As illustrated in FIG. 1B, the surface of the crystal layer 50 side of the element substrate 10 is formed with a pixel electrode 15 disposed for each pixel P and a thin film transistor (hereinafter, referred to as TFT) 30 as a switching element, a signal wire, an insulating film (not shown in the drawings) covering a plurality of the pixel electrodes 15 and an alignment film 18. The pixel electrode 15 may be made of, for example, aluminum (Al) and silver (Ag) or alloy of metal thereof having light reflectivity and a compound such as an oxide and the like.

In addition, a shielding structure in which light is incident on the semiconductor layer in the TFT 30 to cause a light leakage current to flow and which prevents an inappropriate switching operation is adopted.

The opposite substrate 20 is formed of a transparent substrate that uses, for example, a quartz substrate and a glass substrate, and a surface of the liquid crystal layer 50 side is formed with the parting unit 21, a planarization layer 22 covering the parting unit 21, a common electrode layer 23 mounted to cover the planarization layer 22 over at least the pixel area E, an insulating film (not shown in the drawings) covering the common electrode layer 23 and an alignment film 25.

The parting unit 21 is made of metal or metal oxide having for example a light shielding property and is disposed at a position overlapping the scanning line driving circuit 102 with the detection circuit 103 each other in a plane as described in FIG. 1A. Therefore, this results in shielding the light incident from the opposite substrate 20 side and thereby preventing a malfunction due to the light of a peripheral circuit including the driving circuit thereof. In addition, unnecessary stray light is shielded in order to not be incident on the pixel area E and thus ensure a high contrast in a display of the pixel area E.

The planarization layer 22, for example, can form silicon oxide that is a light-transmittance inorganic insulating material having transmittance using an ordinary pressure or a reduced pressure CVD method and the like and has a film thickness of a degree that can relieve the irregularities of the surface thereof caused by the parting unit 21 being formed on the opposite substrate 20.

The common electrode layer 23 adopts the light antireflection structure on which a light-transmissive film having a different refractive index is laminated in order that the light can transmit through the opposite substrate 20 at a high transmittance (in order words, a low reflection index) over a visible light wavelength range and the description thereof will be made later in detail.

The common electrode layer 23 is electrically connected to the wire of the element substrate 10 side by an upper and low conductive member 106 disposed at the four corners of the opposite substrates 20 as illustrated in FIG. 1A.

The alignment film 18 of the element substrate 10 side and the alignment film 25 of the opposite substrate 20 side are set based on an optical design of the liquid crystal device 100 and in the embodiment an inorganic material such as silicon oxide (SiOx) is deposited using a vapor growth method (an oblique evaporation method or an oblique sputtering method) and liquid crystal molecules having a negative dielectric anisotropy have pretilt in a predetermined direction with respect to an alignment film surface and thus an inorganic alignment film which is substantially aligned vertically is adopted.

The opposite substrate 20 has a concave portion 20a on which a portion overlapping with the sealing material 40 in a plane is formed at a constant depth. The concave portion 20a is formed to reach the outer periphery of the substrate from the outside of the parting unit 21 of the opposite substrate 20. The planarization layer 22, the common electrode layer 23, the insulating film (not shown in the drawings) and the alignment film 25 are also in each concave portion 20a. If the thickness of the liquid crystal layer 50 being disposed between the element substrate 10 and the opposite substrate 20 is d, a spacer (not shown) having a larger diameter than the thickness d of the liquid crystal layer 50 in consideration of the depth of the concave portion 20a is included in the sealing material 40. According to a cross-sectional structure of such an opposite substrate 20, since the element substrate 10 and the opposite substrate 20 are bonded to each be oppositely disposed using the sealing material 40 in which the spacer has a larger diameter than thickness d of the liquid crystal layer 50, a variation in thickness of the liquid crystal layer 50 can be suppressed.

As illustrated in FIG. 2, the liquid crystal device 100 includes a plurality of scan lines 3a and a plurality of data lines 6a as signal lines insulated from each other and perpendicular to each other in at least a pixel area E and a capacitance line 3b parallel to the scan line 3a. In addition, an arrangement of the capacitance line 3b is not limited thereto and may be disposed to be parallel to the data line 6a.

A pixel electrode 15, a TFT 30 and a storage capacitor 16 are disposed in an area divided by the scan line 3a and the data line 6a and thus are composed of a pixel circuit of a pixel P.

The scan line 3a is electrically connected to a gate of the TFT 30 and the data line 6a is electrically connected to a source of the TFT 30. The pixel electrode 15 is electrically connected to a drain of the TFT 30.

The data line 6a is connected to a data line driving circuit 101 (see FIGS. 1A and 1B) and supplies image signals D1, D2, . . . , Dn supplied from the data line driving circuit 101 to the pixel P. The scan line 3a is connected to the scanning line driving circuit 102 (see FIGS. 1A and 1B) and supplies the scan signals SC1, SC2, . . . , SCm supplied from the scanning line driving circuit 102 to each pixel P. The image signals D1 to Dn supplied from the data line driving circuit 101 to a data line 6a may be supplied in line sequential order and may be supplied for a group with respect to a plurality of data lines 6a adjacent to each other. The scanning line driving circuit 102 supplies the scan signals SC1 to SCm to the scan line 3a in a pulsed manner at a predetermined timing in line sequential order.

The liquid crystal device 100 is a configuration in which the image signals D1 to Dn supplied from the data line 6a are written to the pixel electrode 15 at a predetermined timing because the TFT 30 such as the switching element is turned on state by the input of the scan signals SC1 to SCm only during predetermined period. Therefore, the image signals D1 to Dn of a predetermined level written to the liquid crystal layer 50 via the pixel electrode 15 are retained for a predetermined period between the pixel electrode 15 and the common electrode layer 23 disposed to be opposite via the liquid crystal layer 50.

In order to prevent the retained image signals D1 to Dn from leaking, the storage capacitor 16 is connected to be parallel with the liquid crystal capacitance formed between the pixel electrode 15 and the common electrode layer 23. The storage capacitor 16 is disposed between a drain of the TFT 30 and a capacitance line 3b.

In addition, although a detection circuit 103 illustrated in FIG. 1A is connected to the data line 6a and is a configuration that can confirm operation defects of the liquid crystal device 100 by detecting the image signal in a manufacturing process of the liquid crystal device 100, it is omitted in an equivalent circuit in FIG. 2. In addition, the detection circuit 103 may include a sampling circuit supplying the image signal to the data line 6a as a sampling circuit and a pre-charge circuit supplying a pre-charge signal of a predetermined voltage level to the data line 6a prior to the image signal.

Such a liquid crystal device 100 is a reflection type and adopts an optical design having a normally black mode in which the pixel P becomes a dark display during non-driving and a normally white mode in which the pixel P becomes a bright display during non-driving. According to the optical design, a polarizing element is disposed to be used on an incident side of the light (emitting side).

As illustrated in FIG. 3, the scan line 3a, a first interlayer insulating film 11 covering the scan line 3a, a TFT 30, a second interlayer insulating film 12 covering the TFT 30, a pixel electrode 15, the insulating film 17 covering the pixel electrode 15 and the alignment film 18 are formed on the element substrate 10 in this order.

The scan line 3a serves as a light-shielding film shielding the semiconductor layer 30a of the TFT 30 and can use a metallic element including at least one of Al, Ti, Cr, W, Ta, Mo and the like, an alloy, a metal silicide, polysilicide, nitride or a stacked combination thereof.

The semiconductor layer 30a of the TFT 30, for example, has a light doped drain (LDD) configuration formed by introducing impurities such phosphorus and the like into the polysilicon and is formed on the first interlayer insulating film 11. A gate electrode 30g is formed at a position opposite to a channel area over a gate electrode film (not shown) covering the semiconductor layer 30a. A gate electrode 30g and the scan line 3a are electrically connected to each other via a contact hole (not shown) passing through the first interlayer insulating film 11.

In order that at least a portion is overlapped with the semiconductor layer 30a and the gate electrode 30g, for example, the data line 6a made of Al and an alloy thereof is formed.

A first source and drain area of the semiconductor layer 30a and the data line 6a are electrically connected via the contact hole CNT 1 formed on the second interlayer insulating film 12. A conductive layer embedding the contact hole CNT 1 acts as the source electrode 31.

A second source and a drain area of the semiconductor layer 30a and the pixel electrode 15 are electrically connected to the contact hole CNT 2 formed on the second interlayer insulating film 12. A conductive layer embedding the contact hole CNT 2 acts as a drain electrode 32.

As described above, for example, the pixel electrode 15 has a light reflectivity formed by using Al and Ag or a metallic alloy thereof and a compound such as an oxide. The thickness of the pixel electrode 15 nm is 50 nm to 100 nm.

An insulating film 17 covering the pixel electrode 15, for example is made of silicon oxide and can be formed by a sputtering method and a plasma CVD method and the like and the film thickness of the insulating film 17 is approximately 100 nm.

The alignment film 18 can be formed by depositing an inorganic material such as SiOx and the like using a vapor growth method. The thickness of the alignment film 18 is approximately 75 nm.

The liquid crystal layer 50 side of the opposite substrate 20 disposed to be opposite to the element substrate 10 is formed with a planarization layer 22 having transmittance covering a black matrix (BM), a first light-transmissive film 23a having conductivity and having a refractive index higher than that of the planarization layer 22, a second light-transmissive film 23b having insulation and having a refractive index lower than that of the first light-transmissive film 23a, a third light-transmissive film 23c having conductivity and having a refractive index higher than that of the second light-transmissive film 23b, an insulating film 24 and an alignment film 25 in this order. The common electrode layer 23 in which the light antireflection configuration is adopted is configured by the first light-transmissive film 23a, the second light-transmissive film 23b and the third light-transmissive film 23c, which are formed to be stacked.

The black matrix (BM) is formed in a lattice shape extending in the X direction and the Y direction in the opposite substrate 20 in a plan view in order to divide the pixels P and is formed on the same layer as the parting unit 21. Therefore, the black matrix having the same reference numerals as the parting unit 21 will be described below. The BM 21 can be formed by laminating for example, a metal such as Al and a signal layer of alloy thereof or Al and an alloy thereof and titanium (Ti) and an alloy thereof, which have a light shielding property. In this embodiment, the BM 21 is formed by patterning Al deposited by the sputtering method in a lattice shape. The thickness thereof is approximately 75 nm. In addition to this, Al on which an alignment mark used when the element substrate 10 and the opposite substrate 20 are bonded to each other is deposited, is patterned and is deposited on the opposite substrate.

The irregularities caused by the BM 21 and the alignment mark occur on a surface of the opposite substrate 20. The film thickness forms the light antireflection structure obtained by laminating the light-transmissive film by less than the difference between the top of a concave portion and the bottom of a concave portion in the irregularities and forms the planarization layer 22 covering a surface of the opposite substrate 20 in order that the light antireflective structure is not damaged or deformed.

The planarization layer 22 can be formed using an inorganic insulating material as described above. In the embodiment, the planarization layer 22 is obtained by forming a boron phosphorus silicon glass (BPSG) membrane on which B and P are doped on silicon oxide under the ordinary pressure or the reduced pressure CVD. The film thickness thereof is approximately 300 nm. In addition, a planarization process such as a chemical mechanical polishing (CMP) may be performed until the thickness becomes about 300 nm after the thickness is deposited at 500 nm to 1000 nm. Therefore, a flatter depositing surface is obtained. In addition, the BPSG film has an excellent hygroscopicity can prevent unnecessary water and gas from diffusing into the liquid crystal layer 50 and can improve the hygroscopicity of the liquid crystal device 100. In addition, the planarization layer 22 which makes the planarization possible by covering the irregularities is not limited to silicon oxide doped with both B and P and one of B and P may be doped on silicon oxide.

The first light-transmissive film 23a, the second light-transmissive film 23b and the third light-transmissive film 23c are formed on the planarization layer 22 in this order. The first light-transmissive film 23a and the third light-transmissive film 23c, for example, can be formed using a transparent conductive film such as ITO. The second light-transmissive film 23b, for example, can be formed using an inorganic insulating material such as silicon oxide.

A contact portion electrically connects the first light-transmissive film 23a and the third light-transmissive film 23c is not formed on the second light-transmissive film 23b through the second light-transmissive film 23b, the first light-transmissive film 23a having conductivity is in an electrically floating state. Even through the first light-transmissive film 23a is in a floating state, since the third light-transmissive film 23c closer to the liquid crystal layer 50 acts as so-called common electrode and is electrically connected to the above-mentioned upper and low conductive portion 106, the first light-transmissive film 23a is not affected by an electrical driving of the liquid crystal layer 50.

The insulating film 24 covering the third light-transmissive film 23c is made of silicon oxide and can be formed by the sputtering method and the plasma CVD method similar to the insulating film 17 of the element substrate 10 side.

The thickness of the insulating film 24 is approximately 100 nm. In addition, the insulating film 24 is patterned so as not to cover the upper and low conductive portion 106 described above.

The alignment film 25 can be formed by depositing an inorganic material such as SiOx using a vapor phase growth method in the same manner as the alignment film 18 of the element substrate 10 side.

In such as the reflective type liquid crystal device 100, for example, a light incident from the opposite substrate 20 side is reflected by transmitting through the liquid crystal layer 50 by the pixel electrode 15. Therefore, the light is returned back to the incident path and then is transmitted through the liquid crystal layer 50. Next, the light is emitted from the opposite substrate 20 side and then becomes a reflective light L1. A portion of the light is reflected at an interface of the light-transmissive film having a different refractive index. In the opposite substrate 20 side, the light becomes a reflective light L2 including the light reflected at the interface between the planarization layer 22 and the first light-transmissive film 23a and the interface between the second light-transmissive film 23b and the third light-transmissive film 23c. In addition, for example, the light becomes a reflective light L3 including the light reflected at the interface between the first light-transmissive film 23a and the second light-transmissive film 23b and the interface between the third light-transmissive film 23c and the insulating film 24. Since the reflective light L2 and L3 are each reflected via different optical paths, it has phase of the light corresponding to a length of each optical path.

In addition, in an embodiment, since a quartz substrate is used as the opposite substrates 20, the refractive index of the quartz substrate is almost identical to that of the planarization layer 22 made of BPSG film (approximately 1.5) and a reflection of the light at the interface between the opposite substrate 20 and the planarization layer 22 barely occurs. Similarly, the reflection of the light hardly occurs even at the interface between the insulating film 24 and the alignment film 25 formed using the silicon oxide each other.

Since the reflective light L1 reflected from the opposite substrate 20 is modulated and becomes a display light, it is necessary to prevent the contrast reduction caused by unnecessary reflective light L2 and L3. In an embodiment, a phase of the light reflected at the interface of the light-transmissive film of the different refractive index in the common electrode layer 23 makes an intensity of the reflective light L2 and L3 small as a cancellation state and can prevents attenuation and interference fringes caused by interference of a reflective light L1 with reflective light L2 and L3. By achieving a high transmittance by incorporating the light antireflection structure into the opposite substrate 20, the high reflectance can be realized over a visible light wavelength area of the reflective light L1 in the liquid crystal device 100. That is, a bright display is possible.

The antireflection structure introduced into the common electrode layer 23 makes the intensity of the reflective light L2 and L3 the smallest by the phase of the light reflected at the interface of the light-transmissive film having the different refractive index setting the length of the optical path in order that the phases canceled each other out. The optical length is given by a product of a refractive index of the light-transmissive film and the film thickness. Therefore, it is preferable that the refractive index of each light-transmissive film and the film thickness are set in order to meet the following Equations (1) and (2).

$$n1 \times d1 + n2 \times d2 = \lambda/4 \quad (1)$$

$$N2 \times d2 + n3 \times d3 = \lambda/4 \quad (2)$$

n1 denotes a refractive index of the first light-transmissive film 23a, d1 denotes a film thickness of the first light-transmissive film 23a, n2 denotes a refractive index of the second light-transmissive film 23b, and d2 denotes a film thickness of the second light-transmissive film 23b. n3 denotes a refractive index of the third light-transmissive film 23c, and d3 denotes a film thickness of the third light-transmissive film 23c. $\lambda$ is a wavelength of light. The refractive index n1, n2 and n3 of each light-transmissive film depend on the wavelength $\lambda$ of the light.

For example, if the wavelength $\lambda$ of the light is 550 nm, the refractive index n1 and the refractive index n3 become approximately 2.0 when the first light-transmissive film 23a and the third light-transmissive film 23c are formed using ITO. Similarly, if the second light-transmissive film 23b is formed using the silicon oxide, the refractive index n2 is approximately 1.5. Therefore, in order to meet the Equations (1) and (2), for example, if the thickness of the first light-transmissive film 23a and the third light-transmissive film 23c is approximately 30 nm, the film thickness of the second light-transmissive film 23b becomes approximately 50 nm. In addition, necessarily, even through the Equations (1) and (2) are met, if the refractive index of each light-transmissive film and the thickness are set in order to be close to the satisfied conditions, the transmittance of the opposite substrate 20 is improved over the related art. In particular, in order to ensure a high even transmittance in a wavelength range of the visible light (the wavelength of the light is 400 nm to 700 nm), it is preferable that the film thickness of the first light-transmissive film 23a and the third light-transmissive film 23c having the conductivity is thinner than 30 nm, in an embodiment of the present invention is selected as 20 nm±6 nm (30%) and the thickness of the second light-transmissive film 23b is as selected as the range of 60 nm±9 nm (15%). It is possible that the opposite substrate 20 having such a common electrode layer 23 ensures the transmittance of the light equal to or greater than 99% over the visible light wavelength area (400 nm to 700 nm).

According to a first embodiment, the effects described below are obtained.

(1) The reflective type liquid crystal device 100 has the common electrode layer 23 into which the light antireflective structure is incorporated on the opposite substrate 20 side on which the light is incident. In addition, the common electrode layer 23 is formed on the planarization layer 22. Therefore, because the even light antireflective function is obtained from the pixels P, the reflective type liquid crystal device 100 making a bright display possible can be achieved without being affected by the irregularities of the surface of the opposite substrate 20 caused by the BM 21 and the like.

(2) Since the planarization layer 22 is constituted by a BPSG film in which the hygroscopicity is excellent, it is possible to reduce the diffusion of the gas and water in the liquid crystal layer 50. In addition, since the contact portion is not formed on the second light-transmissive film 23b that the contact portion passes through, the water and the gas are not diffused from the contact portion. Therefore, the liquid crystal device 100 in which the bright display is made possible and high reliability can be obtained in moisture resistance can be realized.

Second Embodiment

Electronic Apparatus

Figure 4:
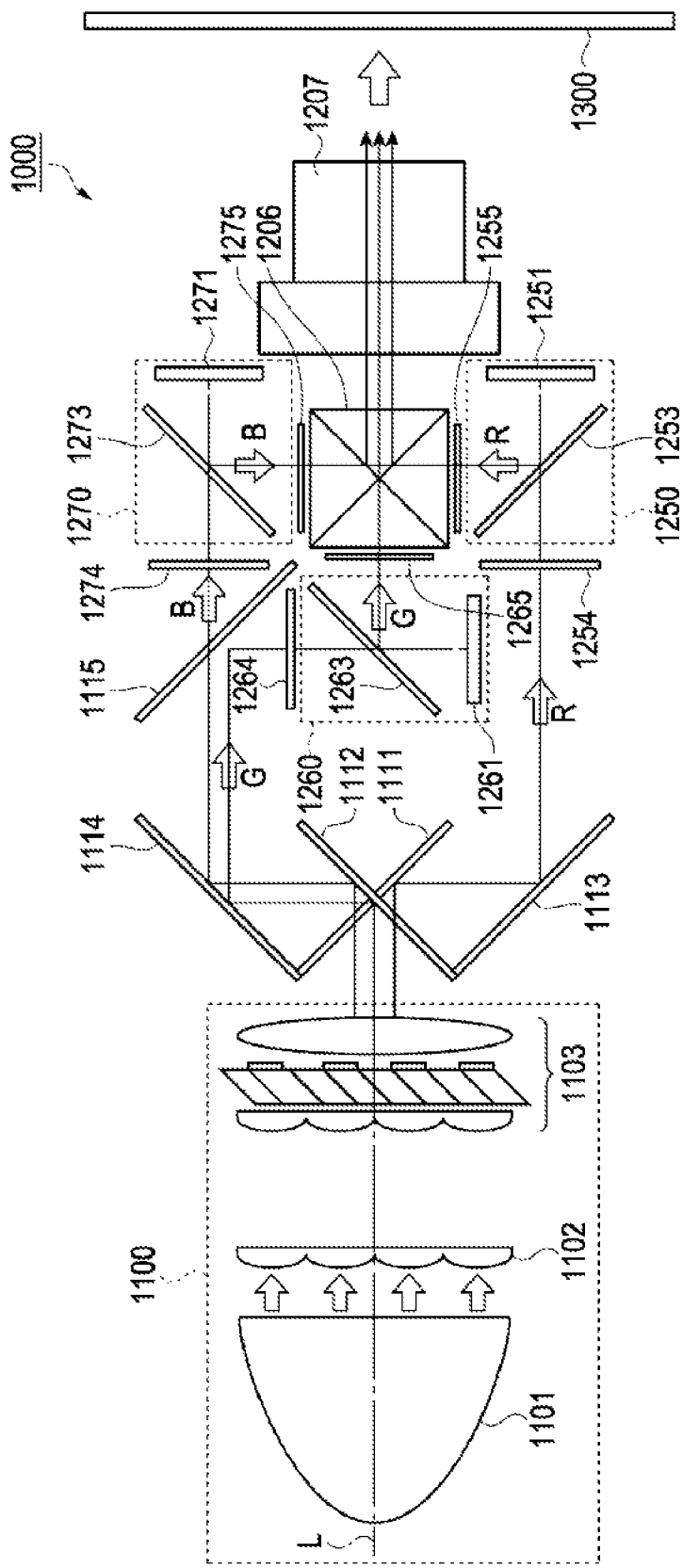
FIG. 4 is a schematic diagram illustrating a configuration of a projection-type display device as an electronic apparatus.

Next, a projection type display device as an electronic apparatus of the embodiment will be described with reference to FIG. 4. FIG. 4 is a schematic diagram illustrating a configuration of a projection type display device as the electronic apparatus.

As illustrated in FIG. 4, the projection type display device 1000 as the electronic apparatus of the embodiment includes a polarization illumination device 1100 disposed along a system optical axis L, three dichroic mirrors 1111, 1112 and 1115, two reflection mirrors 1113 and 1114, reflective liquid crystal light valves 1250, 1260 and 1270 as three optical modulation elements, a cross dichroic prism 1206 and a projection lens 1207.

The polarization illumination device 1100 systemically includes a lamp unit 1101 as a light source composed of a white light source such as a halogen lamp, an integrator lens 1102 and a polarization conversion element 1103.

A polarized light flux emitted from the polarization illumination device 1100 is incident on the dichroic mirror 1111 and the dichroic mirror 1112, which are disposed to be perpendicular to each other. The dichroic mirror 1111 as a light separation element reflects red light (R) of the incident polarization flux.

The other dichroic mirror 1112 as the light separation element reflects green light (G) and blue light (B) of the incident polarization flux.

The reflected red light (R) is reflected back by the reflection mirror 1113 and is incident on the liquid crystal light valve 1250. Meanwhile, the reflected green light (G) and the blue light (B) are reflected back by the reflection mirror 1114 and are incident on the dichroic mirror 1115 as the light separation element. The dichroic mirror 1115 reflects the green light (G) and transmits the blue light (B). The reflected green light (G) is incident on the liquid crystal light valve 1260. The transmitted blue light (B) is incident on the liquid crystal light valve 1270.

The liquid crystal light valve 1250 includes a reflective type liquid crystal panel 1251 and a wire-grid polarizing plate 1253 as a reflective polarizing element.

The liquid crystal light valve 1250 is disposed such that the red light (R) reflected by the wire-grid polarizing plate 1253 is incident to be perpendicular to an incident surface of the cross dichroic prism 1206. In addition, an auxiliary polarizing plate 1254 which supplements a polarization degree of the wire-grid polarizing plate 1253 is disposed on an incident side of the red light (R) in the liquid crystal light valve 1250 and an auxiliary polarizing plate 1255 is disposed along the incident surface of the cross dichroic prism 1206 in an emitting side of the red light (R). In addition, when the polarizing beam splitter as the reflective polarizing element is used, it is possible to omit a pair of the auxiliary polarizing plates 1254 and 1255.

Such a configuration of the reflective type liquid crystal light valve 1250 and an arrangement of each configuration are the same even in other reflective type liquid crystal light valves 1260 and 1270.

Each color light incident on the liquid crystal light valves 1250, 1260 and 1270 is modulated based on the image information and is incident on the cross dichroic prism 1206 via the wire-grid polarizing plates 1253, 1263 and 1273. In the cross dichroic prism 1206, each color light is synthesized and the synthesized light is projected on a screen 1300 by the projection lens 1207 and the image is enlarged and displayed.

In the embodiment, the reflective type liquid crystal device 100 in the first embodiment as the reflective type liquid crystal panels 1251, 1261 and 1271 in the liquid crystal light valves 1250, 1260 and 1270 is applied.

According to such a projection type display device 1000, since the reflective type liquid crystal device 100 is used in the liquid crystal light valves 1250, 1260 and 1270, the projection type display device 1000 of a reflection type capable of projecting a bright image can be realized. In addition, it is possible to provide the projection type display device 1000 having high reliability in moisture resistance.

The invention is not limited to the above-mentioned embodiment and can be appropriately changed within the scope which is not contrary to the subject matter or the spirit read from the entire specification and the liquid crystal device 100 accompanying such a change and the electronic apparatus applying the liquid crystal device 100 is included in a technical scope of the invention. Various modification examples can be considered in addition to the embodiment. Hereinafter, modification examples will be described.

Modification Example 1

Figure 5:
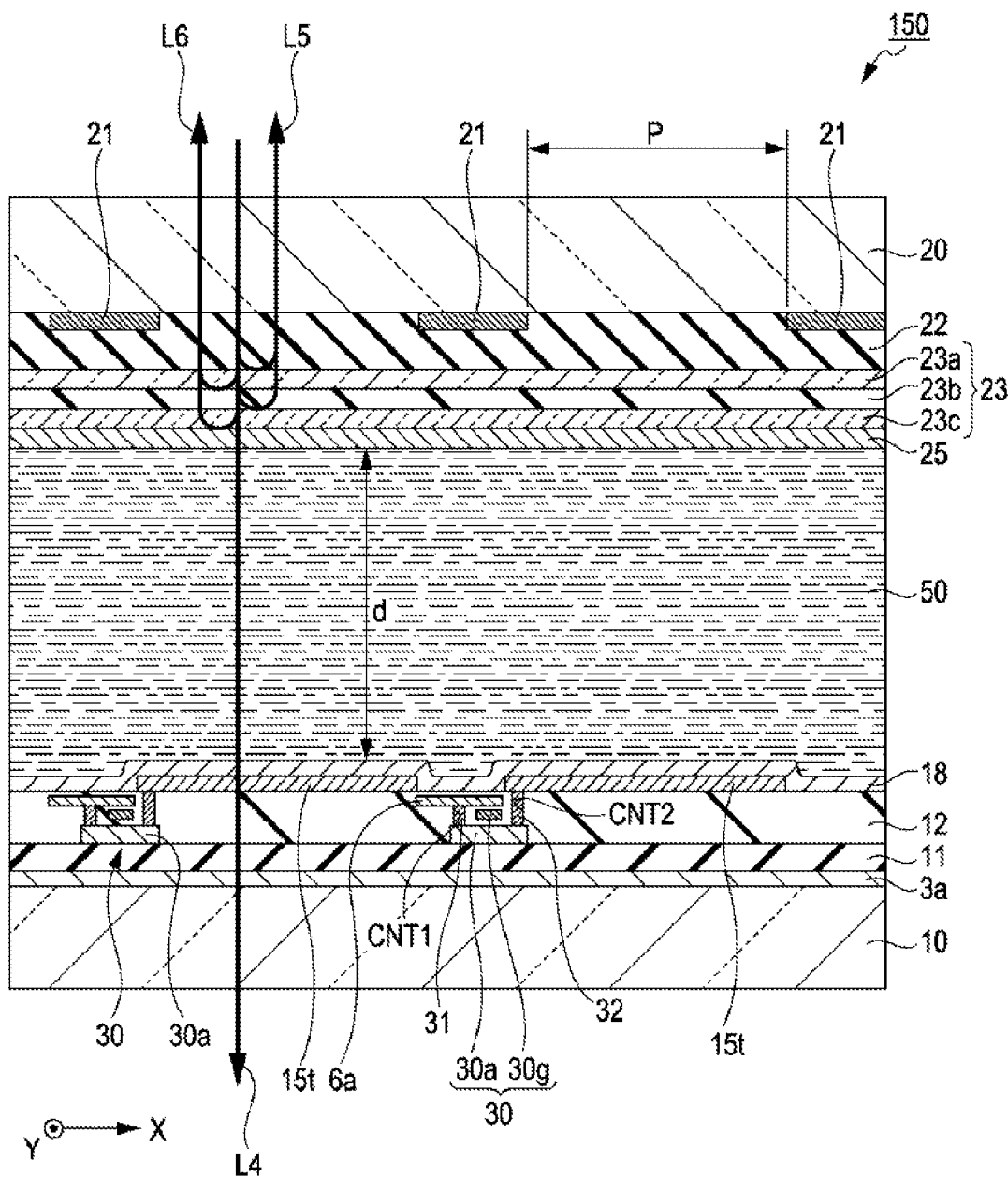
FIG. 5 is a schematic cross-sectional view illustrating a configuration of pixels of a liquid crystal device of a modification example.

The configuration using the opposite substrate 20 into which the light antireflection configuration of the invention is incorporated is not limited to the reflective liquid crystal device 100. FIG. 5 is a schematic cross-sectional view illustrating the configurations of the pixel of the liquid crystal device of the modification example. In addition, in the modification example, the same configurations as the liquid crystal device 100 in the embodiment described above are the same reference numerals and their detailed description has been omitted. As illustrated as FIG. 5, a transmittance, for example, the liquid crystal device 150 of the modification example is a transmission type in which each liquid crystal layer 50 of a negative dielectric anisotropy is disposed between the element substrate 10 on which a quartz substrate having transmittance is used and the opposite substrate 20. The element substrate 10 has a pixel electrode 15t made of the transparent conductive film, for example, ITO, IZO and the like and TFT 30 controls to switch the pixel electrode 15t. The opposite substrate 20 includes the planarization layer 22 covering the black matrix (BM) 21, the common electrode layer 23 and the alignment film 25. The alignment film 18 covering the pixel electrode 15t and the alignment film 25 covering the common electrode layer 23 are an inorganic alignment film deposited by obliquely evaporating an inorganic material such as silicon oxide and aligns substantially vertically liquid crystal molecules having a negative dielectric anisotropy in the liquid crystal layer 50. In addition, the thickness d of the liquid crystal layer 50 is set slightly larger than that of the reflective type liquid crystal device 100 from a viewpoint of ensuring a brightness of the pixel P.

For example, the light L4 incident from the opposite substrate 20 side transmits through the planarization layer 22, the common electrode layer 23, the liquid crystal layer 50 and the pixel electrode 15t and is emitted from the element substrate 10 side. Since the common electrode layer 23 into which the light antireflection structure is incorporated is formed on the opposite substrate 20, the reflective light L5 including the light reflected at the interface between the planarization layer 22 and the first light-transmissive film 23a from which the refractive index are different and similarly the light reflected at the interface between the second light-transmissive film 23b and the third light-transmissive film 23c of which the refractive index are the same is very small because the length of the optical path is set in order that a phase of each the reflective light cancels each other out. In the same way as the reflective light L6 including the light reflected at the interface between a first light-transmissive film 23a and a second light-transmissive film 23b of which the refractive index are different to each other and similarly the light reflected at the interface between the third light-transmissive film 23c and the alignment film 25 of which the refractive index is different the intensity thereof is very small because the length of the optical path is set in order that the phase of each reflective light cancel each other out. Therefore, for example, as compared with the case selecting the common electrode layer 23 as a signal structure of ITO film, since the transmittance along a visible light wavelength area (400 nm to 700 nm) of the opposite substrate is high, it is possible to provide the liquid crystal device 150 of the transmittance type making the bright display possible. In addition, since the light antireflection structure is formed on the planarization layer 22, an influence on the irregularities caused by BM 21 in the opposite substrate 20 is not exerted. Therefore, in pixels P, a uniform light antireflection function is obtained. In addition, in pixels P, the thickness of the pixel electrode 15t from the viewpoint of ensuring the high transmittance is approximately set to 200 nm.

Modification Example 2

An alignment control of the liquid crystal molecules in the liquid crystal layer 50 of the liquid crystal device to which the invention is applied is not limited to a substantial vertical alignment (VA) and is also applied to a twisted nematic (TN) and an optically compensated bend (OCB).

Modification Example 3

The electronic apparatus capable of applying the liquid crystal device 100 of the embodiment is not limited to the projection type display device 1000 of the above-mentioned embodiment. For example, the electronic apparatus can be preferably used as a display unit of an information terminal device such as a projection type head-up display (HUD), a direct-view type head-mounted display (HMD) or e-book, a personal computer, a digital still camera, a liquid crystal TV, a video recorder of a viewfinder type or direct-view monitor, a navigation system, an electronic notebook, POS and the like.

This application claims priority from Japanese Patent Application No. 2011-240912 filed in the Japanese Patent Office on Nov. 2, 2011, the entire disclosure of which is hereby incorporated by reference in its entirely.

What is claimed is:

1. A liquid crystal device comprising:
a first substrate;
a second substrate that is light-transmissive;
a liquid crystal layer that is disposed between the first substrate and the second substrate;
a pixel electrode that is light-reflective and is disposed between the first substrate and the liquid crystal layer;
a light shielding layer that is disposed between the second substrate and the liquid crystal layer;
a planarization layer that is transmissive and is disposed between the light shielding layer and the liquid crystal layer;
a first light-transmissive film that is disposed between the planarization layer and the liquid crystal layer and has a higher refractive index than a refractive index of the planarization layer;
a second light-transmissive film that is disposed between the first light-transmissive film and the liquid crystal layer and has a lower refractive index than the refractive index of the first light-transmissive film; and
a third light-transmissive film that is electrically conductive, that is disposed between the second light-transmissive film and the liquid crystal layer, and that has a higher refractive index than the refractive index of the second light-transmissive film,
wherein
a film thickness of the planarization layer is greater than a film thickness of the first light-transmissive film, a film thickness of the second light-transmissive film, and a film thickness of the third light-transmissive film, respectively,
the planarization layer is disposed so as to flatten an irregularity caused by the light shielding layer, and
a film thickness of the light shielding layer is greater than a film thickness of the first light-transmissive film, a film thickness of the second light-transmissive film, and a film thickness of the third light-transmissive film, respectively.

2. The liquid crystal device according to claim 1, wherein the planarization layer has the refractive index substantially equal to the refractive index of the second substrate and is made of silicon oxide including at least one of boron and phosphorus.

3. The liquid crystal device according to claim 1, wherein the first light-transmissive film is electrically conductive, the second light-transmissive film is electrically insulative, and the third light-transmissive film acts as a common electrode, and
the second light-transmissive film does not have a contact portion electrically connecting the first light-transmissive film to the third light-transmissive film.

4. The liquid crystal device according to claim 1, further comprising:
a driving circuit that is disposed between an end of the first substrate and the pixel area on which the pixel electrode is disposed; and
a light-shielding member that is disposed between the second substrate and the planarization layer at a position overlapping with the driving circuit in a plan view.

5. An electronic apparatus including the liquid crystal device according to claim 1.

* * * * *